United States Patent
Gross et al.

(10) Patent No.: US 10,452,510 B2
(45) Date of Patent: Oct. 22, 2019

(54) HYBRID CLUSTERING-PARTITIONING TECHNIQUES THAT OPTIMIZES ACCURACY AND COMPUTE COST FOR PROGNOSTIC SURVEILLANCE OF SENSOR DATA

(71) Applicant: Oracle International Corporation, Redwood Shores, CA (US)

(72) Inventors: Kenny C. Gross, Escondido, CA (US); Mengying Li, La Jolla, CA (US); Alan Paul Wood, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 156 days.

(21) Appl. No.: 15/793,742

(22) Filed: Oct. 25, 2017

(65) Prior Publication Data
US 2019/0121714 A1    Apr. 25, 2019

(51) Int. Cl.
| | | |
|---|---|---|
| *G06F 11/30* | (2006.01) | |
| *G06F 11/00* | (2006.01) | |
| *G06F 21/55* | (2013.01) | |
| *G06N 7/00* | (2006.01) | |
| *G06F 17/18* | (2006.01) | |
| *G06N 3/08* | (2006.01) | |
| *G06N 20/00* | (2019.01) | |

(52) U.S. Cl.
CPC ........ *G06F 11/3093* (2013.01); *G06F 11/008* (2013.01); *G06F 17/18* (2013.01); *G06F 21/55* (2013.01); *G06N 3/08* (2013.01); *G06N 7/005* (2013.01); *G06N 20/00* (2019.01)

(58) Field of Classification Search
CPC ............. G06F 11/3089; G06F 11/3093; G06F 11/079; G06F 11/0709; G06F 11/3466
See application file for complete search history.

(56) References Cited

U.S. PATENT DOCUMENTS

| | | | | |
|---|---|---|---|---|
| 7,562,814 B1* | 7/2009 | Shao | ..................... | G06F 21/552 235/375 |
| 2007/0040582 A1* | 2/2007 | Gross | ........................ | G06F 1/28 326/88 |
| 2009/0306920 A1* | 12/2009 | Zwinger | ............ | G01R 31/2884 702/77 |
| 2010/0004900 A1* | 1/2010 | Bougaev | .................. | G01H 1/00 702/188 |

(Continued)

*Primary Examiner* — Yolanda L Wilson
(74) *Attorney, Agent, or Firm* — Park, Vaughan, Fleming & Dowler LLP

(57) ABSTRACT

The disclosed embodiments relate to a system for performing prognostic surveillance operations on sensor data. During operation, the system obtains a group of signals from sensors in a monitored system during operation of the monitored system. Next, if possible, the system performs a clustering operation, which divides the group of signals into groups of correlated signals. Then, for one or more groups of signals that exceed a specified size, the system randomly partitions the groups of signals into smaller groups of signals. Next, for each group of signals, the system trains an inferential model for a prognostic pattern-recognition system based on signals in the group of signals. Then, for each group of signals, the system uses a prognostic pattern-recognition system in a surveillance mode and the inferential model to detect incipient anomalies that arise during execution of the monitored system.

17 Claims, 10 Drawing Sheets

(56) References Cited

U.S. PATENT DOCUMENTS

| | | | | |
|---|---|---|---|---|
| 2010/0324882 A1* | 12/2010 | Urmanov | ............... | H04Q 9/00 703/21 |
| 2013/0024414 A1* | 1/2013 | Herzog | ............. | G05B 23/0243 706/52 |
| 2013/0269038 A1* | 10/2013 | Takahashi | ............... | H04L 9/32 726/26 |
| 2017/0102691 A1* | 4/2017 | Sait | ............... | G05B 19/41855 |
| 2018/0336483 A1* | 11/2018 | Gross | ................... | G06N 20/00 |

* cited by examiner

HYBRID CLUSTERING-PARTITIONING TECHNIQUES THAT OPTIMIZES ACCURACY AND COMPUTE COST FOR PROGNOSTIC SURVEILLANCE OF SENSOR DATA

BACKGROUND

Field

The disclosed embodiments generally relate to techniques for performing prognostic surveillance operations on sensor data. More specifically, the disclosed embodiments relate to a hybrid clustering-partitioning technique that optimizes accuracy and compute cost for prognostic surveillance operations to facilitate proactive anomaly detection based on sensor data.

Related Art

Intense research efforts are presently underway in cloud computing companies to develop prognostic machine-learning (ML) and deep-learning (DL) techniques for facilitating proactive anomaly-detection operations on sensor data for various Internet of Things (IoT) applications. A common challenge in performing IoT prognostics operations relates to the sheer number of sensors to be analyzed. Enormous numbers of sensors are presently being deployed to monitor critical-assets in various customer systems. For example, a medium-sized data center can include over 1,000,000 sensors monitoring thousands of business-critical servers, a modern passenger jet can include 75,000 sensors, and an oil refinery can include over 1,000,000 sensors.

At present, the most successful machine-learning prognostic techniques originate from a class of mathematics called nonlinear, nonparametric (NLNP) regression. These techniques include: neural networks (NNs), support vector machines (SVMs), auto-associative kernel regression (AAKR), and the Multivariate State Estimation Technique (MSET). Unfortunately, the training operations for all of the foregoing NLNP anomaly-detection techniques consume considerable computational resources that scale approximately with the square of the number of sensors being monitored.

This quadratic growth in compute cost can be somewhat mitigated by dividing the available sensors into subsets and monitoring the subsets in parallel. However, dividing the universe of available sensors into random subsets is ineffective for prognostic anomaly detection, because the groups of signals need to possess some degree of cross-correlation for prognostic anomaly-detection techniques to work properly. Moreover, when the degree of cross-correlation is weak, more signals are better in maximizing prognostic accuracy. On the other hand, when the degree of cross-correlation is strong, smaller groups of signals can be monitored while still attaining acceptable prognostic accuracy, and thereby saving significant compute cost. Hence, there exists a complex and nontrivial relationship between the number of subsets of signals to be monitored in parallel, the prognostic accuracy attainable for detecting anomalies, and the overhead compute cost for prognostics.

Therefore, what is needed is a prognostic surveillance technique that accurately detects anomalies based on data from large numbers of sensors with an acceptable compute cost.

SUMMARY

The disclosed embodiments relate to a system for performing prognostic surveillance operations on sensor data. During operation, the system obtains a group of signals from sensors in a monitored system during operation of the monitored system. Next, if possible, the system performs a clustering operation, which divides the group of signals into groups of correlated signals. Then, for one or more groups of signals that exceed a specified size, the system randomly partitions the groups of signals into smaller groups of signals. Next, for each group of signals, the system trains an inferential model for a prognostic pattern-recognition system based on signals in the group of signals. Then, for each group of signals, the system uses a prognostic pattern-recognition system in a surveillance mode and the inferential model to detect incipient anomalies that arise during execution of the monitored system.

In some embodiments, while randomly partitioning the groups of signals into smaller groups of signals, the system uses a dual-objective iterative partitioning procedure, which optimizes a tradeoff between prognostic accuracy and compute cost during subsequent prognostic surveillance operations.

In some embodiments, the dual-objective iterative partitioning procedure iteratively: partitions the groups of signals into smaller groups of signals in a random manner, without considering correlations between the groups of signals; trains and runs the inferential model on the smaller groups of signals; determines a compute cost and an associated prognostic accuracy involved in training and running the inferential model on the smaller groups of signals; and terminates the iterative procedure when a balance point is reached between compute cost and prognostic accuracy.

In some embodiments, prior to performing the dual-objective iterative partitioning procedure, the system allows a user to pre-specify the balance point between compute cost and prognostic accuracy.

In some embodiments, while performing the clustering operation, the system uses either k-means clustering or tri-point clustering (TPC).

In some embodiments, the inferential model is trained using a nonlinear, nonparametric (NLNP) regression technique.

In some embodiments, the NLNP regression technique comprises a Multivariate State Estimation Technique (MSET).

In some embodiments, using the prognostic pattern-recognition system to detect an incipient anomaly comprises detecting one or more of the following: an impending failure of the monitored system; and a malicious-intrusion event in the monitored system.

In some embodiments, while obtaining the group of signals, the system: obtains the group of signals from the sensors during operation of the monitored system; stores the group of signals in a time-series database; and subsequently retrieves the group of signals from the time-series database for use in the dual-objective iterative partitioning procedure.

BRIEF DESCRIPTION OF THE FIGURES

FIG. 3A presents a table containing cross-correlation coefficients for the 10 signals in accordance with the disclosed embodiments.

FIG. 3B presents a table containing cross-correlation coefficients for a first cluster of five correlated signals in accordance with the disclosed embodiments.

FIG. 3C presents a table containing cross-correlation coefficients for a second cluster of five correlated signals in accordance with the disclosed embodiments.

DETAILED DESCRIPTION

Figure 1:
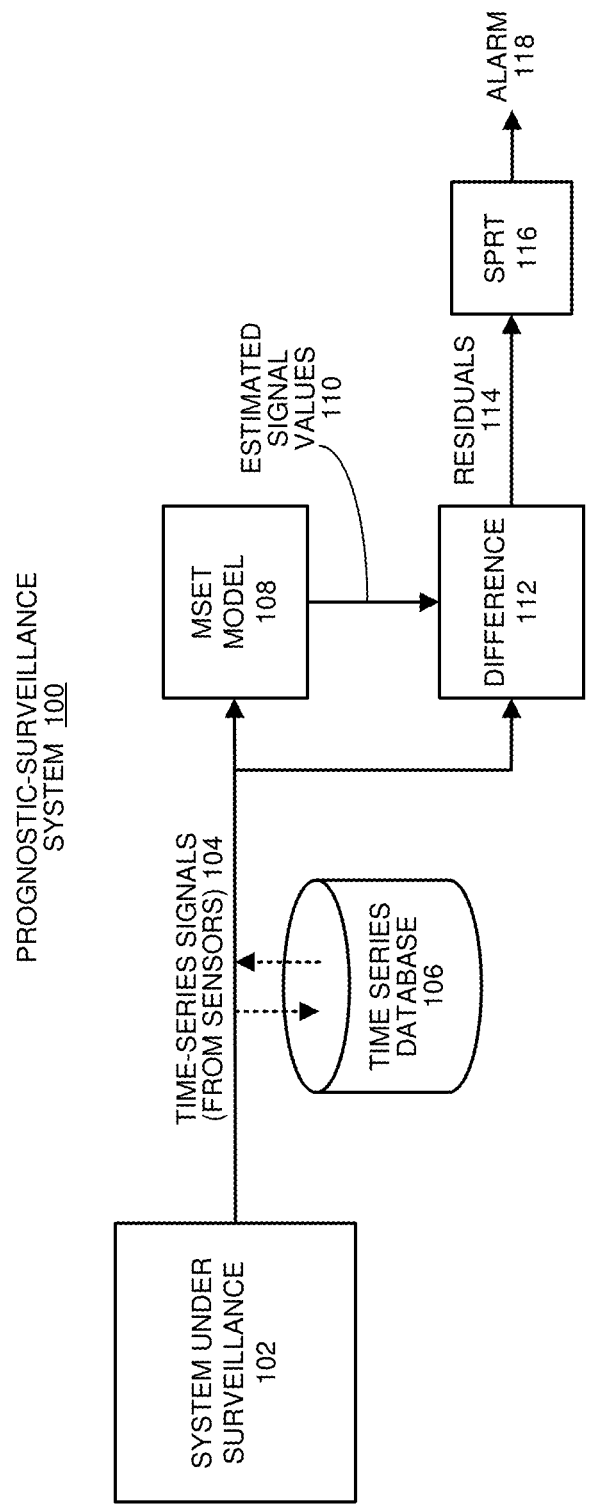
FIG. 1 illustrates an exemplary prognostic surveillance system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to the design of a new prognostic-surveillance system that subdivides a large collection of sensor signals in a manner that achieves dual-level optimization of both prognostic accuracy for detection of anomalies and overhead compute cost. By default, the system achieves an optimal balance between high prognostic accuracy and low compute cost. However, for any given application, if accuracy is more important and compute cycles are relatively cheap, the system allows a user to "turn the knob" and optimize in the direction of highest possible prognostic accuracy for detecting subtle anomalies. Similarly, if the user's application already provides sufficient accuracy, but compute cost is becoming burdensome, the system allows the user to optimize in the direction of minimal compute cost. Our new prognostic surveillance system can be used to monitor applications with any number of signals, any degree of cross-correlation among those signals, and any signal-to-noise ratio for the individual signals.

It is well-known that the compute cost for NLNP pattern-recognition techniques, such as MSET, increases roughly with the square of the number of sensors under surveillance. Consequently, as NLNP regression techniques have evolved over the last three decades, data scientists would routinely exercise caution by limiting the number of sensors that are monitored. It is also common practice to ask subject-matter-experts (SMEs) for the systems-to-be-monitored to help identify the "most important" sensors that would provide the greatest prognostic value for surveillance operations. However, this is a very human-intensive exercise, and one that many SMEs may not want to help with. Note that for facilities, such as datacenters and oil refineries, which include more than 1,000,000 sensors, it is understandable that an SME would not be thrilled to review thousands of available sensors to help identify the "important" ones.

Fortunately, a number of automated techniques have emerged over the past 20 years to help data scientists trim the number of signals to be monitored for prognostic purposes. The most common approach is to generate a cross-correlation matrix, rank the correlation coefficients, and select a threshold that eliminates the least-correlated signals. An improvement on this approach is called stepwise-regression, wherein the weakest correlated signals are discarded one at a time. A major drawback of these techniques, which use correlation as a "goodness" metric, is that cross-correlation coefficients are only defined for "stationary" process metrics. If there exists a trend to the time-series signals, this trend skews the cross-correlation matrix, which may cause models to be built based on signals that actually have only random associations, but have a small trend in their mean. Similarly, nonlinear associations among signals can cause naïve approaches based upon cross-correlation scoring to eliminate important signals, and include signals that have very weak associations.

Another approach that has emerged over the past 20 years is to perform a clustering operation, which breaks large collections of signals into correlated clusters. The most common approach is "k-means clustering." However, a superior approach for clustering signals that contain nonlinear associations is tri-point clustering (TPC). (See U.S. patent application Ser. No. 13/833,757, entitled "Pre-Attribute Clustering Using Tri-Point Data Arbitration," by inventors Alan P. Wood, et al., filed on Mar. 15, 2013.)

Note that using clustering to divide sensor signals is preferable to cross-correlation techniques (but not sufficient for surveillance purposes) for the following simple reason. If a system provides a collection of signals, wherein half the signals come from Asset-1, and half come from Asset-2, such that the first half of the signals are independent and uncorrelated with the second half of the signals, then a conventional approach that "throws out" signals with low cross-correlation coefficients (CCCs) will produce an inaccurate model, because the conventional approach will encounter low CCC values and eliminate a signal from Asset-1 simply because it is poorly correlated with signals from Asset-2, whereas if the signals were clustered properly, the signal could have very high CCCs with other signals from Asset-1.

The reasons that using clustering alone is not sufficient for surveillance purposes include the following. (1) There is no way to balance the compute cost for a "downstream" NLNP prognostic system. Consequently, a naïve clustering technique applied to 100 signals may identify 90 signals that belong in a first cluster, and 10 signals that belong in a second cluster. In this example, the naïve clustering technique operated properly, but the compute cost for prognostics, which is quadratic with the number of signals, remains far from optimal. (2) For large clusters of signals that are all well-correlated, for example the 90 clustered signals in the above example, if the cluster of 90 signals is partitioned into two groups of 45 signals each, then the compute cost would be lower. Moreover, if the uniform cluster of 90 signals were subdivided into 9 clusters of 10 signals each, the compute cost would be even lower, again because of the quadratic savings in compute cost for monitoring multiple sub-groups in parallel. However, creating progressively smaller sub-groups at some point degrades the accuracy of the NLNP prognostic system. This is because for uniformly correlated signals, a large model with 90 signals will produce much higher prognostic accuracy than 9 smaller models with 10 signals each.

In the above-described prognostic surveillance process, there is a complex tradeoff among a number of factors, including: the size of groups of signals to be monitored; the degree of correlation (or "similarity") among signals in each group; and the overall compute cost for the parallel implementations of NLNP pattern recognition, which is quadratic with the number of signals in each group summed across groups; and prognostic accuracy for each group, which is a function of the cross-correlation among signals in that group and diminishes as the number of signals in each group decreases. This complex tradeoff presents a nontrivial multi-objective, multi-constraint numerical optimization challenge. An effective technique to address this challenge, which finds a balance point in the complexity tradeoff, will necessarily be "numerical," because there do not exist any analytical functional relationships among: the number of signals; the degree of intra-correlation inside clusters and inter-correlation among disparate clusters; the accuracy of the NLNP prognostic technique; and the overall compute cost for the prognostic operations, which can be solved by conventional analytical optimization formalism approaches.

Moreover, an effective technique to address the complexity is further complicated because during the optimization, two operations can be taken, clustering or partitioning. Partitioning reduces compute cost but drives up uncertainty for the prognostics. In contrast, clustering reduces compute cost without penalizing accuracy of the prognostics. However, the ability to cluster depends on the interrelationships among signals in whatever assets or processes are under surveillance. Hence, depending on the assets under surveillance, there could be just one large cluster, a few clusters, or dozens of clusters.

Before describing our new prognostic-surveillance technique, we first provide some definitions. Although the terms "clustering" and "partitioning" are somewhat synonymous and interchangeable across various applications, we distinguish between these terms as follows. Clustering in the context of this disclosure refers to dividing a large group of signals into groups that have a high inter-correlation (or, more generally, "similarity") within each cluster. In contrast, for a group of signals that has a uniform inter-correlation (or "similarity"), we use "partitioning" to subdivide such signals into groups without any scoring for correlation or similarity.

Note that both "clustering" and "partitioning" reduce compute cost for NLNP prognostic operations, but with different effects on prognostic accuracy, which, in turn depends on the number of signals in each group and the average degree of correlation or similarity within each group. This complex interplay between metrics cannot be defined using mathematical functions, and is consequently solved using an iterative empirical technique, which is described below. However, before describing the details of this iterative technique, we first describe an exemplary prognostic-surveillance system.

Exemplary Prognostics-Surveillance System

FIG. 1 illustrates an exemplary prognostic-surveillance system 100 in accordance with the disclosed embodiments. As illustrated in FIG. 1, this exemplary system 100 operates on a group of time-series signals 104 obtained from sensors in a system under surveillance 102. Note that system under surveillance 102 can generally include any type of system or facility that produces sensor data. As mentioned above, a system that produces such sensor data can include: a data center including a large number of servers; a passenger jet; an oil refinery; or a nuclear power plant.

During operation of prognostic-surveillance system 100, the time-series signals 104 can feed into a time-series database 106, which can store the time-series signals 104 for subsequent analysis. Next, the time-series data 104 either feeds directly from system under surveillance 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive calculation that is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using a Sequential Probability Ratio Test (SPRT) module 116 to detect anomalies and possibly to generate an alarm 118. (For a description of the SPRT, please see Wald, Abraham, June 1945, "Sequential Tests of Statistical Hypotheses." *Annals of Mathematical Statistics*. 16 (2): 117-186.) In this way, prognostic-surveillance system 100 can proactively alert system operators of incipient anomalies, such as impending failures or malicious intrusion events, hopefully with enough lead time so that such problems can be avoided or proactively fixed.

Prognostic Accuracy Versus Compute Cost Tradeoffs

We now discuss various tradeoffs between "prognostic accuracy" and "compute cost" that influence the design of our prognostic-surveillance system. First, we provide a simple example, which illustrates how the accuracy of prognostics is improved by clustering signals. In the following discussion, we measure the "accuracy" of prognostics by computing the root-mean-square error (RMSE) of the prediction generated by the NLNP technique. (The lower the RMSE, the better the accuracy of the NLNP technique.) Note that if a collection of time-series signals is comprised of signals that originate from two independent assets, then we would not expect any improvement in prognostic accuracy by analyzing the collection of signals together.

Figure 2:
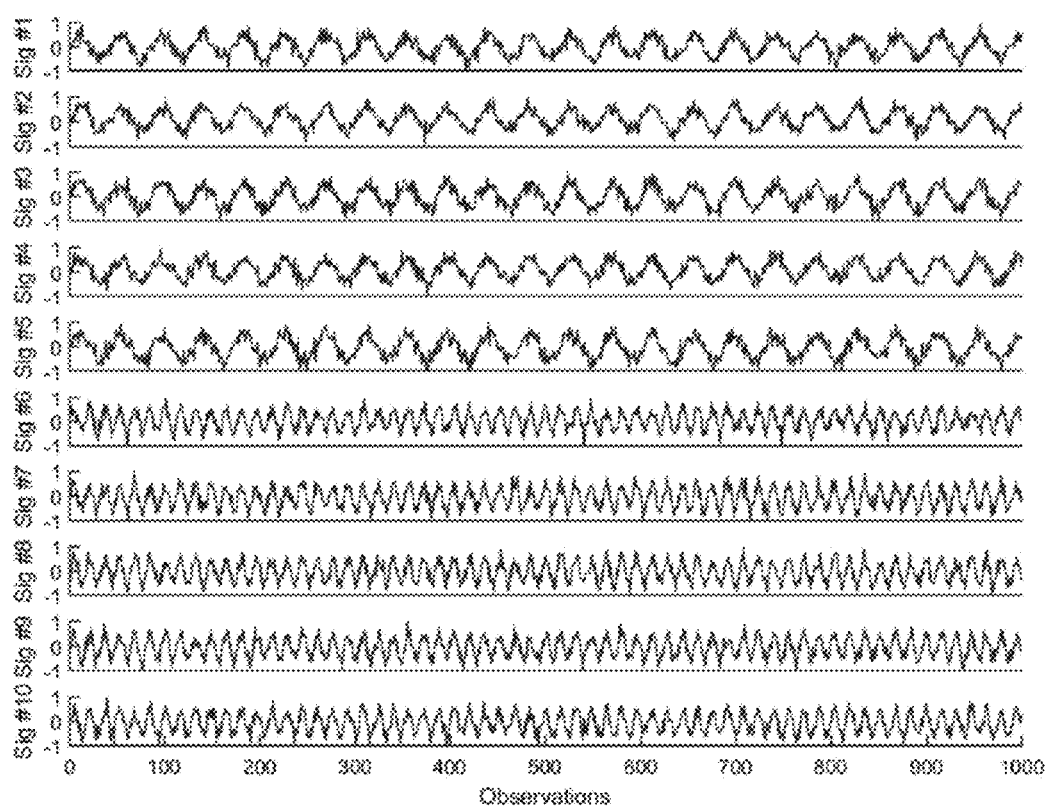
FIG. 2 illustrates an exemplary set of 10 signals in accordance with the disclosed embodiments.
Figures 3A, 3B, 3C:
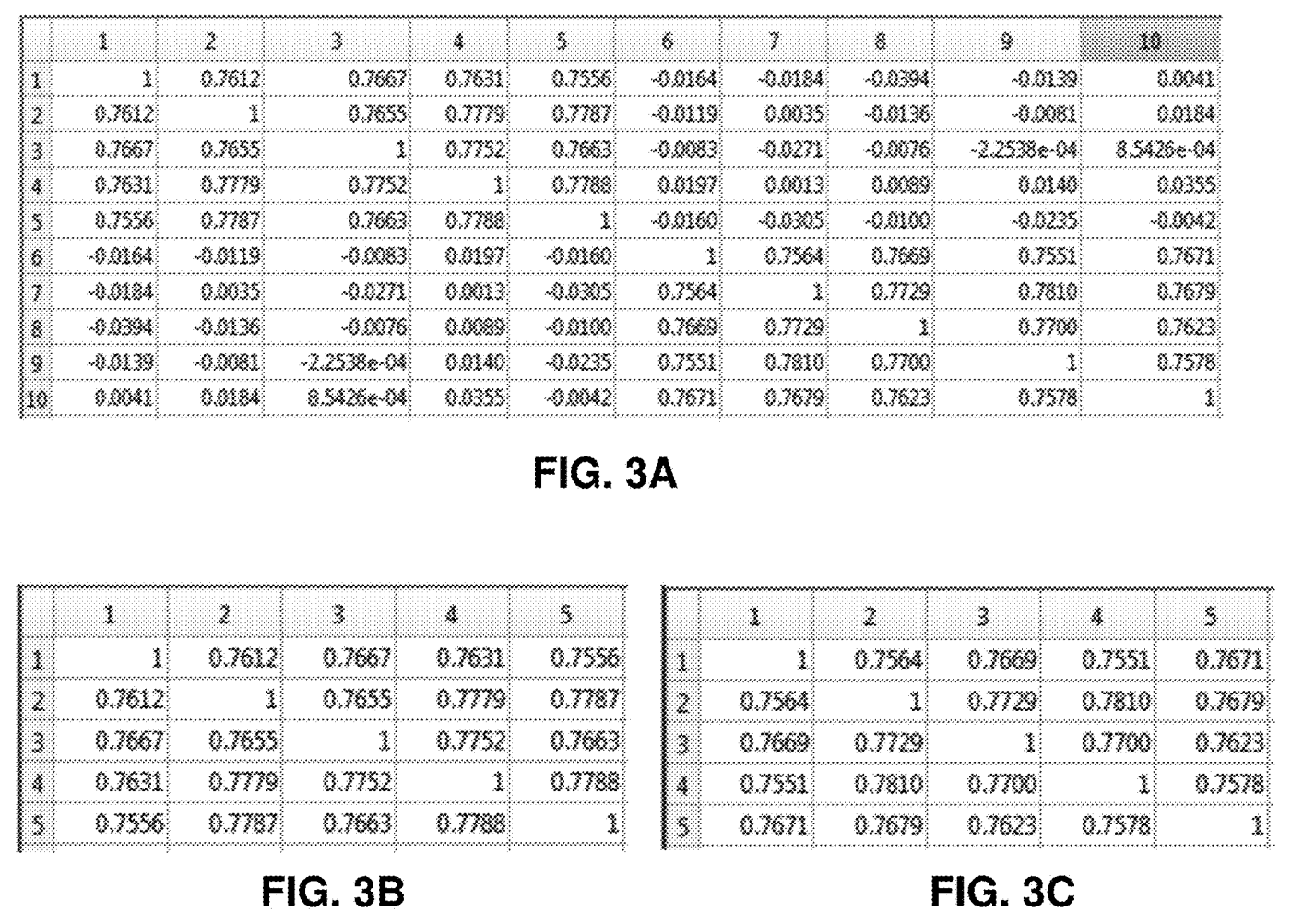

For example, consider a system that generates the 10 signals shown in FIG. 2, which comprise five well-correlated signals from Asset-1, and five well-correlated signals from a different Asset-2, where there is no association between the two independent assets. FIG. 3A presents a cross-correlation matrix for all 10 signals together. It is obvious from this matrix that it would not make sense to apply prognostics to the collection of all 10 signals together, because correlations between some signals are high (greater than 0.7), while correlations between other signals are close to zero or even negative. In contrast, FIGS. 3B and 3C present cross-correlation matrices for two groups of five signals, which were obtained by using the TPC clustering technique to divide the 10 signals into two groups of five signals. Note that using the TPC clustering technique is advantageous because TPC uses a similarity operator that is robust to nonlinear interactions among signals that can significantly distort a conventional cross-correlation coefficient. Also note that after TPC clustering, the resulting two groupings of signals are very well-correlated and would yield excellent prognostic performance.

Although the example above is intuitive, when we deal with large groups of signals with an unknown number of independent clusters, and an unknown number of signals within each cluster, which presents an opportunity for further subdividing via partitioning, human intuition can no longer be a guide. This is because it is not obvious to a human how all the myriad permutations and combinations of clusters and partitions will affect overall prognostic accuracy and overall compute cost.

Figure 4:
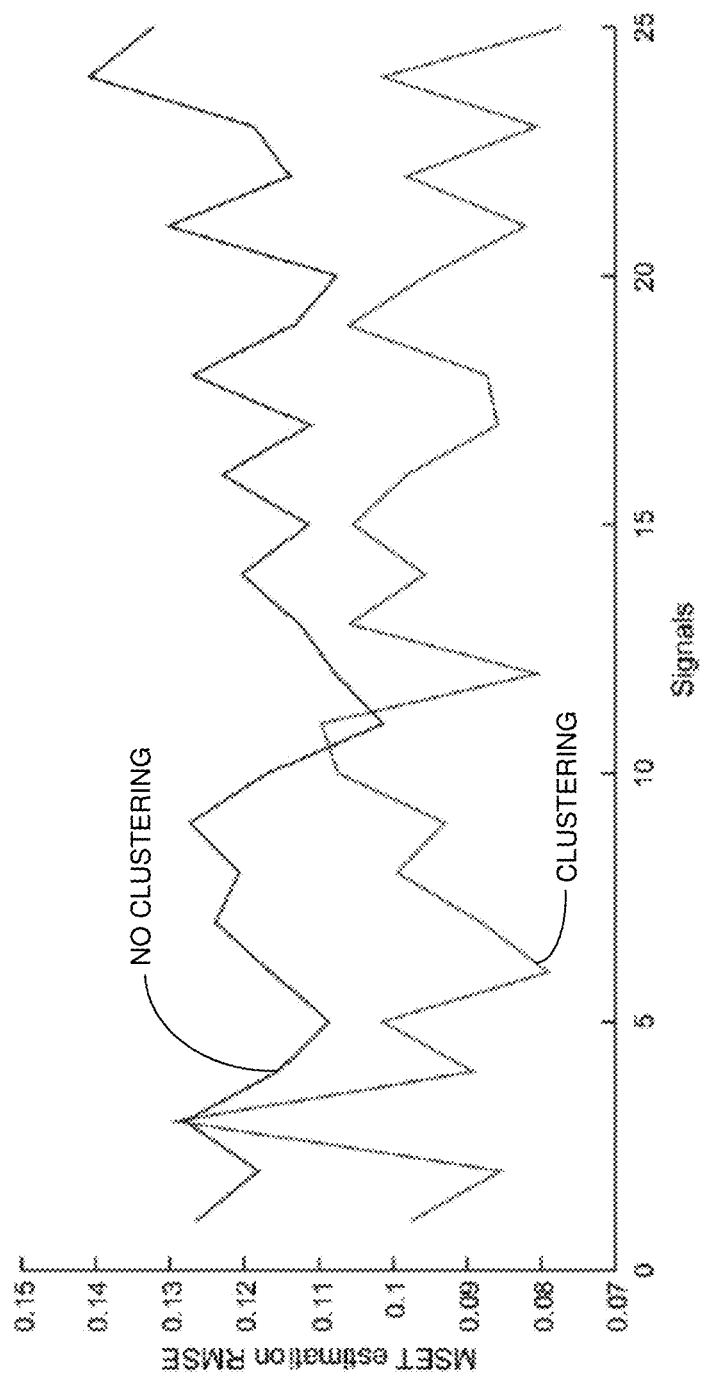
FIG. 4 presents a graph illustrating MSET root-mean-square error (RMSE) with clustering and without clustering for a collection of 25 signals that originate from five independent assets in accordance with the disclosed embodiments.

To address this challenge, we use two different objective functions to guide a systematic iterative numerical approach to arrive at an optimal solution. FIG. 4 present a graph, which illustrates that when we apply just clustering to a collection of 25 signals that originate from five independent assets, the accuracy for the MSET prognostic technique improves when clustering is performed versus no clustering. Note that the lower curve for clustering indicates a lower overall prognostic uncertainty. This is good, but recall that compute cost is a second and often competing objective function, and that clustering is not the only action that can be taken. It is also possible to perform a partitioning operation. Hence, a new framework is needed in which both clustering and partitioning can be independently exercised, while empirically assessing overhead compute cost as a first objective function, and RMSE uncertainty as a second objective function. Note that we cannot just monitor RMSE to determine if clustering is advantageous; we must examine compute cost simultaneously. This is illustrated in FIGS. 5A and 5B, which present two graphs showing a tradeoff in prognostic accuracy versus compute cost for the application of clustering to a large collection of signals.

Figure 5B:
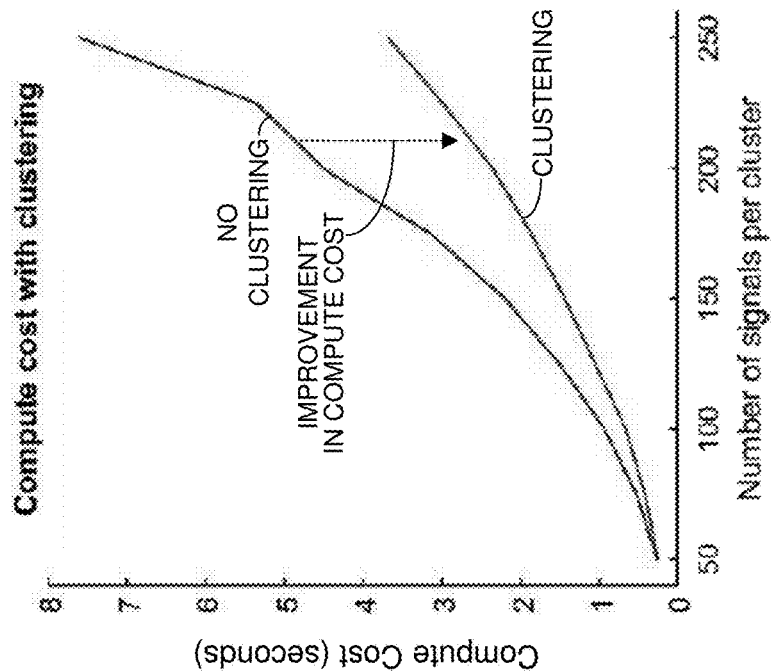
FIGS. 5A and 5B present a pair of graphs illustrating MSET RMSE and compute cost with respect to the number of signals per cluster (both with clustering and without clustering) in accordance with the disclosed embodiments.
Figure 5A:
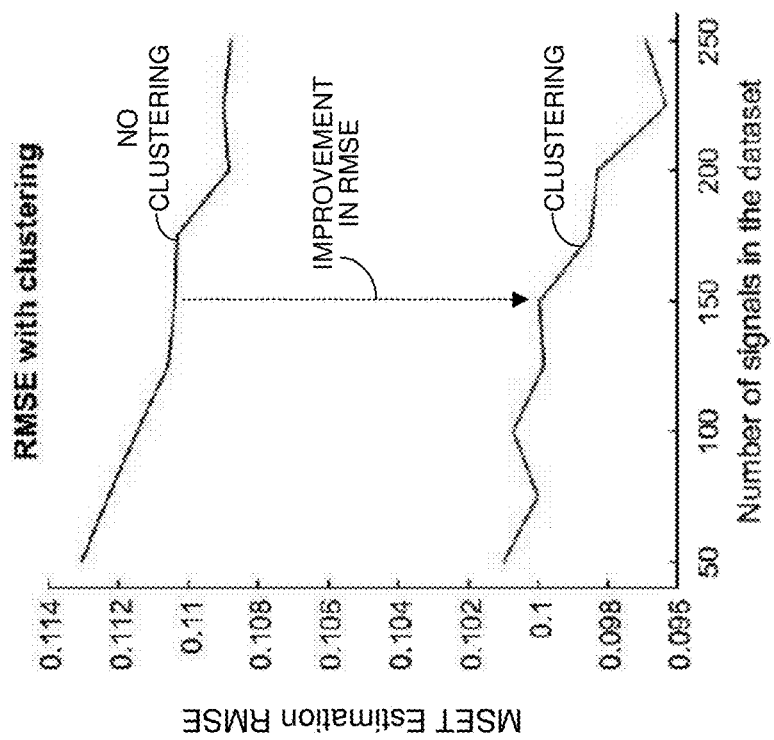

Referring to FIG. 5A, for the no-clustering case, we see that there is an accuracy advantage in analyzing larger numbers of signals. However, there is a quadratic penalty in doing so, which is apparent when we look at the compute cost curve for no-clustering which appears in FIG. 5B.

For the clustering case, the situation is more complicated. There is a "hump" in the uncertainty (RMSE) curve in FIG. 5A, meaning that a slight advantage in accuracy results from having more signals in each cluster, but again there is a quadratic penalty in doing so, when we look at the corresponding "clustering" compute cost curve in FIG. 5B.

The dashed arrows in FIGS. 5A and 5B illustrate how clustering improves both prognostic accuracy and overall compute cost for prognostics operations. However, this improvement due to using clustering only is not sufficient because applying these techniques to large collections of sensor signals is far more complex. A good clustering technique, such as TPC, will often produce very lopsided groupings of signals. This in no way reflects on the quality of TPC, but is a simple reality that one asset in, say, an oil refinery may have hundreds of physical sensors, and a different asset may have only a dozen or fewer sensors. When there exist large differences in the sizes of the clusters, the overall compute cost will be far from optimal, because the quadratic compute cost for the big clusters is much greater than for the smaller clusters.

It is reasonable in this case to wonder if there is further value in partitioning the large clusters. The answer is by no means obvious, because partitioning after clustering will reduce the quadratic penalty of the compute cost, but will also adversely impact the prognostic accuracy for the NLNP prognostics. It is also mathematically intractable to derive a set of functions that can be solved via linear programming (or other numerical optimization approaches) because every set of time-series signals from any type of prognostic application will possess completely different inter-correlation patterns, signal-to-noise ratios, and cluster dependencies.

Figure 6B:
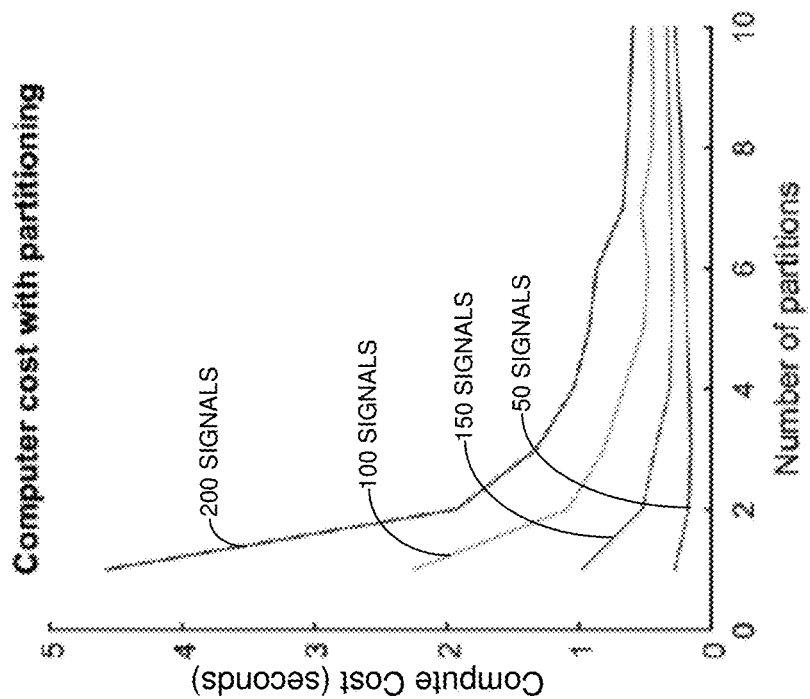
FIGS. 6A and 6B present a pair of graphs illustrating MSET RMSE and compute cost with respect to the number of partitions (both with clustering and without clustering) in accordance with the disclosed embodiments.
Figure 6A:
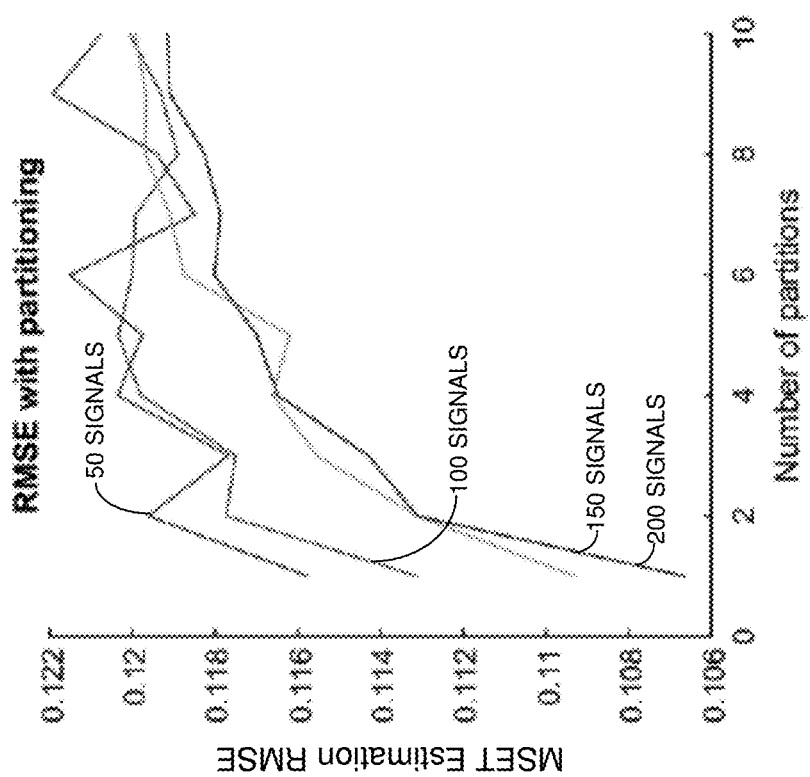
Figure 7B:
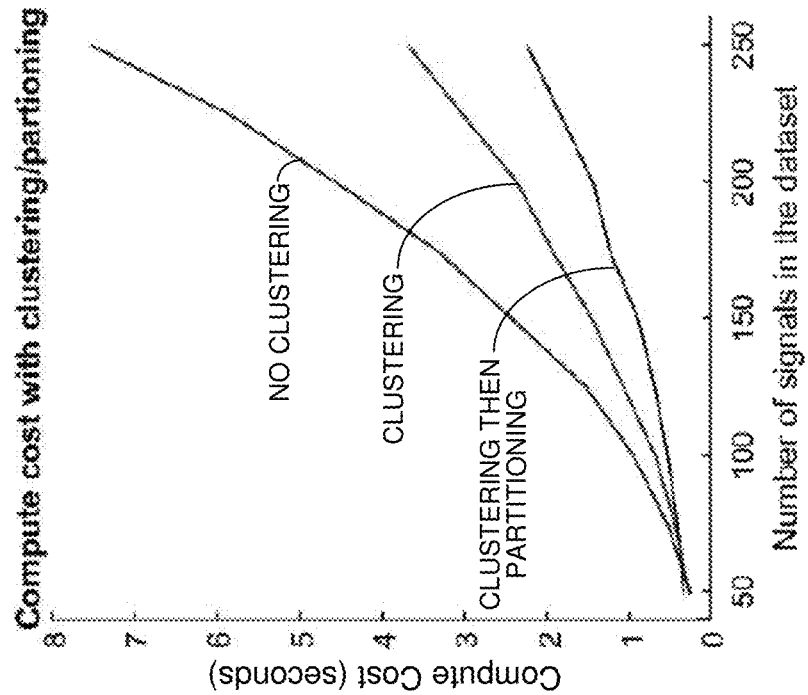
FIGS. 7A and 7B present a pair of graphs illustrating MSET RMSE and compute cost with respect to the number of signals per cluster (for clustering and partitioning, clustering alone and no clustering) in accordance with the disclosed embodiments.
Figure 7A:
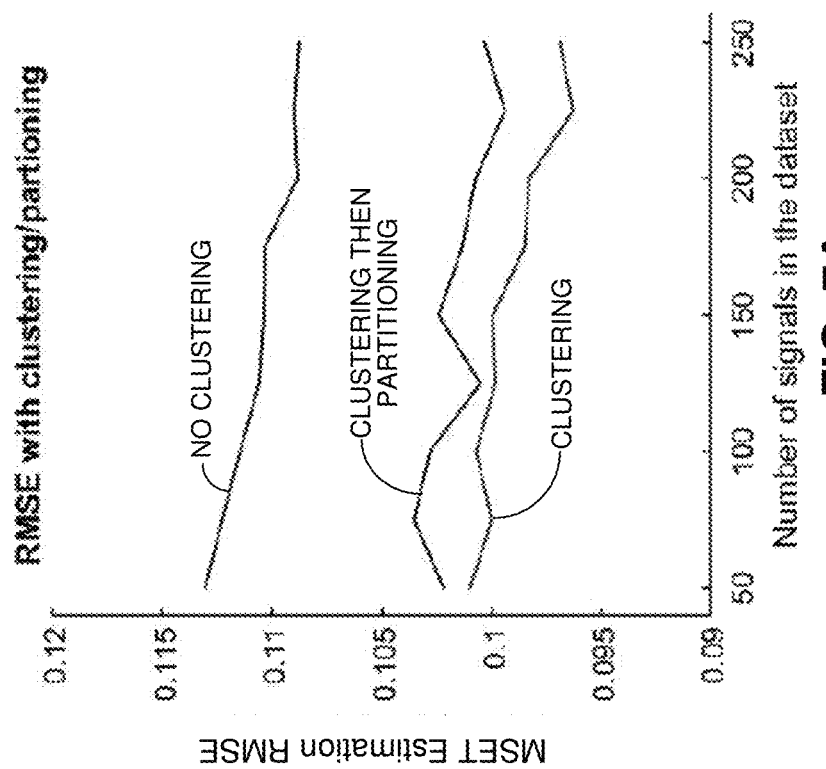

To solve this ostensibly intractable optimization challenge, we have devised an iterative, dual-objective, clustering-partitioning procedure that uses empirical results to guide quantitative improvements in the bivariate tradeoff between prognostic accuracy and overall compute cost. To highlight the advantages of this new procedure, FIGS. 6A and 6B illustrate the RMSE and compute costs for different numbers of partitions and also different numbers of signals. In FIGS. 6A and 6B, we see that if uniform clusters are partitioned into larger numbers of partitions, RMSE goes up, but the associated quadratic penalty in compute cost drops sharply. To further highlight the advantages of this new procedure, FIGS. 7A and 7B illustrate overall RMSE and compute costs for three different cases: (1) no clustering; (2) clustering alone; and (3) clustering, then partitioning. Note that clustering and then partitioning has a slightly higher RMSE than clustering alone, but it also dramatically lowers compute cost.

Figure 8:
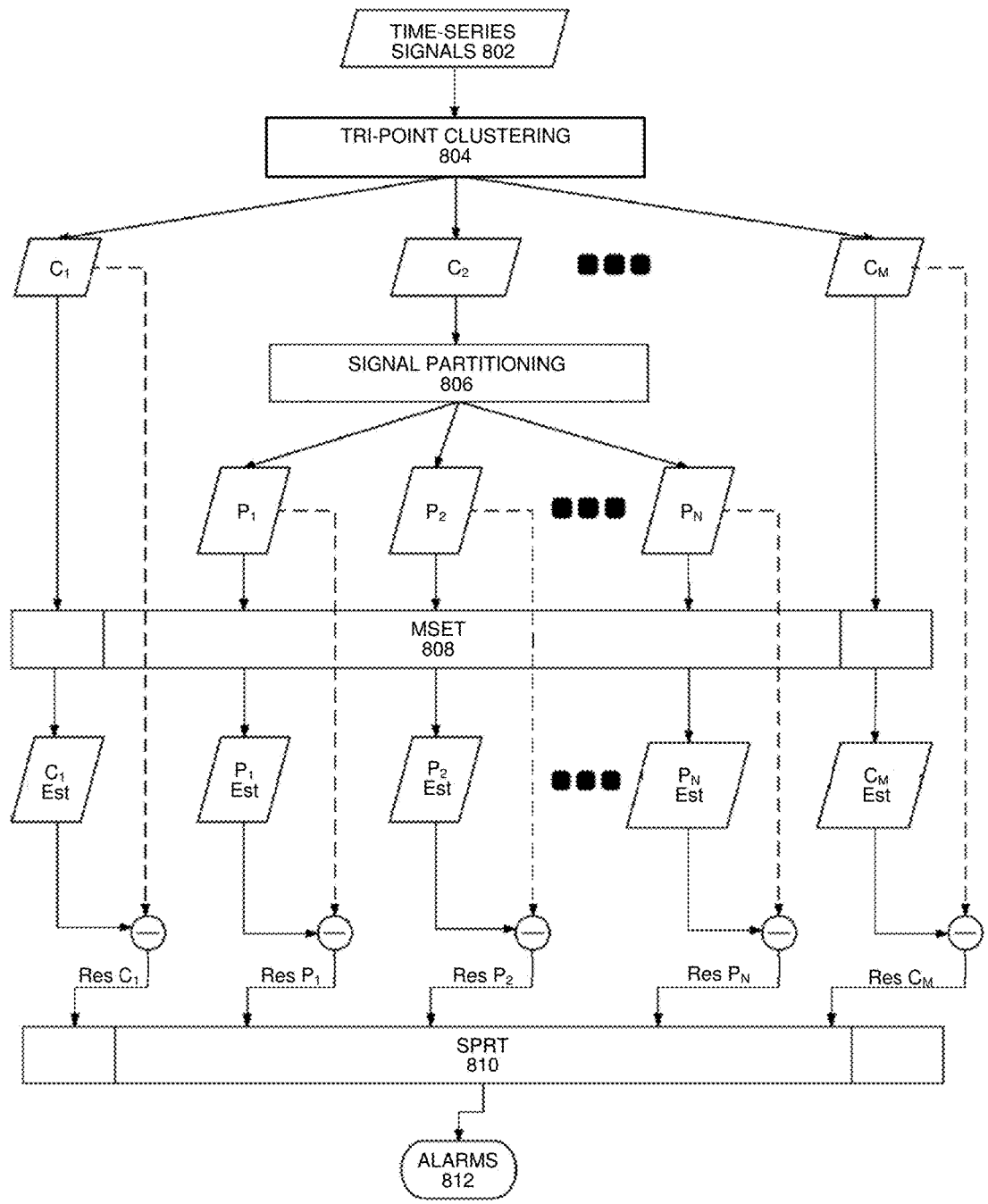
FIG. 8 presents a flow diagram illustrating how clusters and associated partitions are created and processed in accordance with the disclosed embodiments.

To provide a visualization of the overall process, FIG. 8 presents a diagram illustrating how the above-described system creates clusters to facilitate prognostic surveillance operations in accordance with the disclosed embodiments. The system first starts with time-series signals 802 generated by a system under surveillance. These time-series signals 802 feed into a tri-point clustering (TPC) module 804, which clusters time-series signals 802 into a number of clusters, including $C_1, C_2, \ldots$, and $C_M$. Next, for cluster $C_2$, which exceeds a specified size, the system performs a signal-partitioning operation 806 on $C_2$ to divide $C_2$ into a number of partitions, including $P_1, P_2, \ldots$, and $P_N$. Then, the resulting clusters and partitions feed into an MSET module 808, which trains an MSET model for each of the clusters and partitions. Next, MSET module 808 switches to a surveillance mode, wherein the trained MSET models are used to produce estimates for the signals that comprise the clusters and partitions, including $C_1$ Est, $P_1$ Est, $P_2$ Est, $\ldots$, $P_N$ Est, $\ldots$, and $C_M$ Est. Note that these estimates specify that the signals in the clusters and partitions should be based on other correlated variables. Next, the system uses difference modules, which are represented by the "-" signs, to perform pairwise differencing operations between the actual signal values and the estimated signal values to produce residuals for each of the clusters and partitions, including Res $C_1$, Res $P_1$, Res $P_2$, Res $P_N$, $\ldots$, and Res $C_M$. Finally, the system performs a "detection operation" on the residuals 114 by using an SPRT module 810 to detect anomalies and possibly to generate alarms 812.

Prognostics Surveillance Process

Figure 9A:
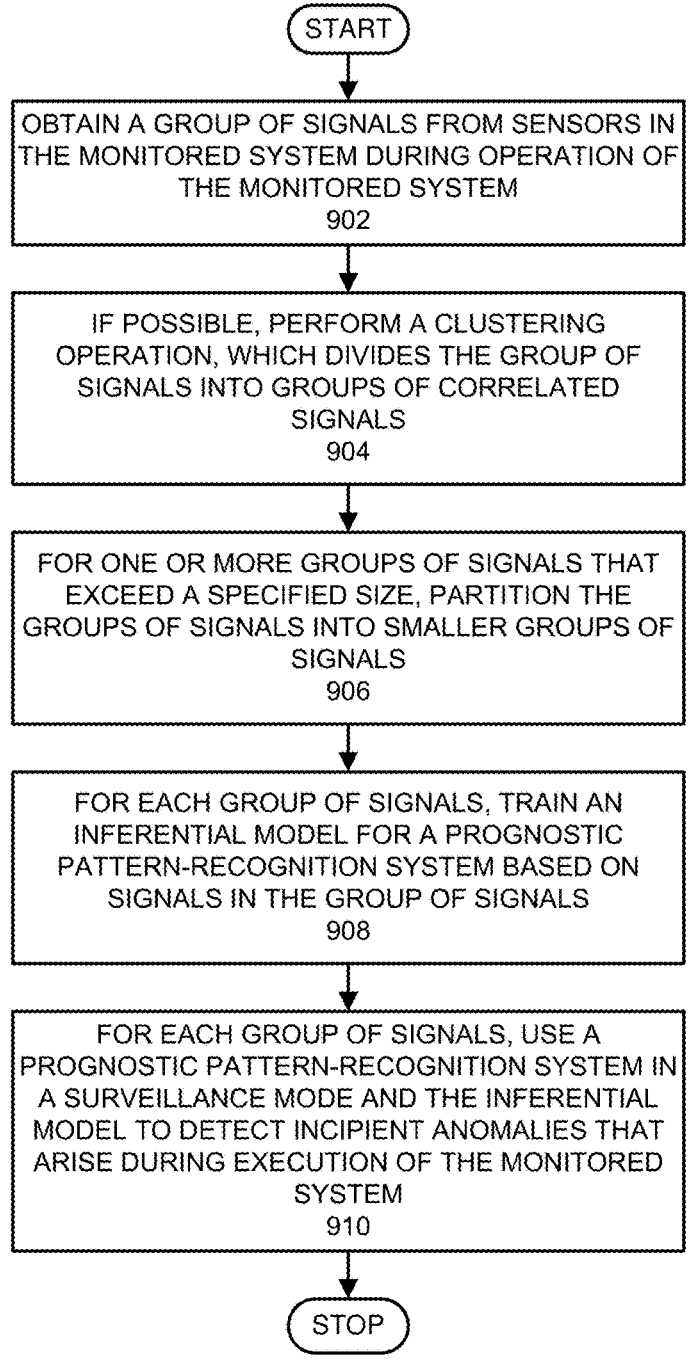
FIGS. 9A and 9B present flow charts illustrating operations involved in facilitating the prognostic surveillance process in accordance with the disclosed embodiments.
Figure 9B:
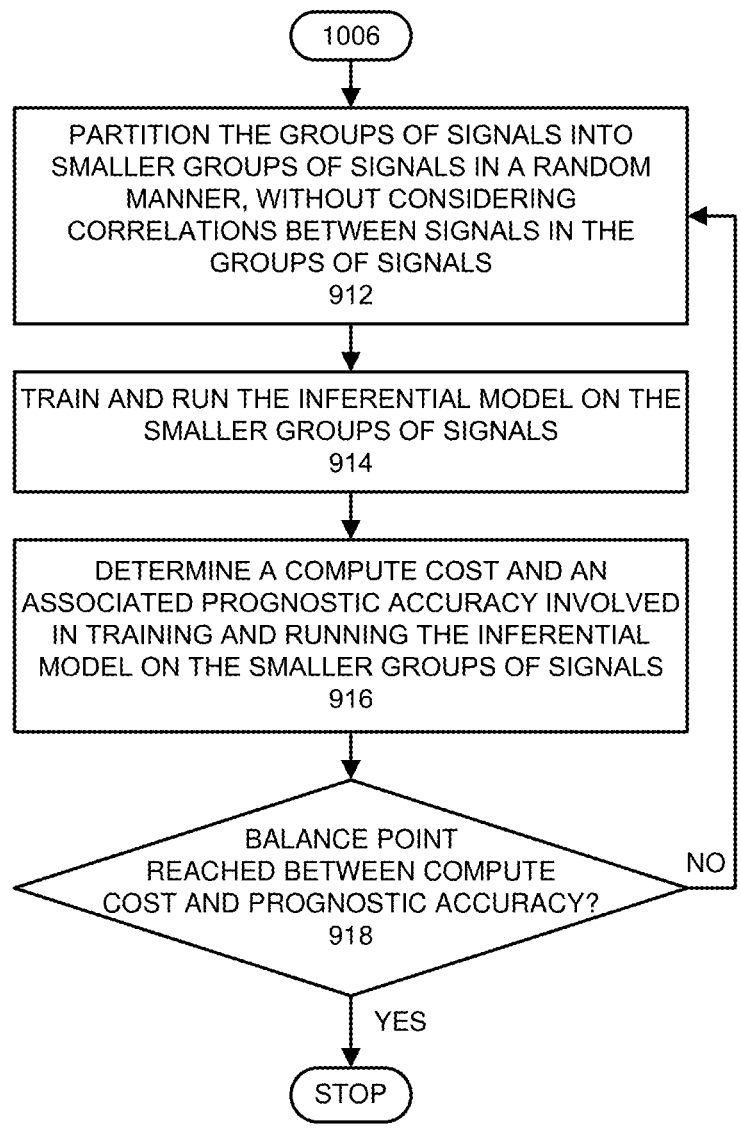

FIGS. 9A and 9B present flow charts illustrating operations involved in facilitating the prognostic surveillance process in accordance with the disclosed embodiments. In FIG. 9A, the system first obtains a group of signals from sensors in a monitored system during operation of the monitored system (step 902). Next, if possible, the system performs a clustering operation, which divides the group of signals into groups of correlated signals (step 904). Then, for one or more groups of signals that exceed a specified size, the system randomly partitions the groups of signals into smaller groups of signals (step 906). Next, for each group of signals, the system trains an inferential model for a prognostic pattern-recognition system based on signals in the group of signals (step 908). Finally, for each group of signals, the system uses a prognostic pattern-recognition system in a surveillance mode and the inferential model to detect incipient anomalies that arise during execution of the monitored system (step 910).

FIG. 9B illustrates operations performed while the system uses an iterative procedure to randomly partition the groups of signals in step 906. First, the system partitions the groups of signals into smaller groups of signals in a random manner, without considering correlations between signals in the groups of signals (step 912). Next, the system trains and runs the inferential model on the smaller groups of signals (step 914). The system then determines a compute cost and an associated prognostic accuracy involved in training and running the inferential model on the smaller groups of signals (step 916). Finally, the system terminates the iterative procedure when a balance point is reached between compute cost and prognostic accuracy (step 918). Otherwise, the system returns to step 912 to repeat the iterative process.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing prognostic surveillance on a monitored system, comprising: obtaining a group of signals from sensors in the monitored system during operation of the monitored system; performing a cluster operation, which divides the group of signals into groups of correlated signals if possible; for one or more groups of signals that exceed a specified size, randomly partitioning the groups of signals into smaller groups of signals; for each group of signals, training an inferential model for a prognostic pattern-recognition system based on signals in the group of signals; for each group of signals, using a prognostic pattern-recognition system in a surveillance mode and the inferential model to detect incipient anomalies that arise during execution of the monitored system; and obtaining from a user a pre-specified balance point between compute cost and prognostic accuracy; wherein randomly partitioning the groups of signals into smaller groups of signals comprises using a dual-objective iterative partitioning procedure, which optimizes a tradeoff according to the pre-specified balance point between prognostic accuracy and compute cost during subsequent prognostic surveillance operations.

2. The method of claim 1, wherein the dual-objective iterative partitioning procedure iteratively:
    partitions the groups of signals into smaller groups of signals in a random manner, without considering correlations between signals in the groups of signals;
    trains and runs the inferential model on the smaller groups of signals;
    determines a compute cost and an associated prognostic accuracy involved in training and running the inferential model on the smaller groups of signals; and
    terminates the iterative procedure when a balance point is reached between compute cost and prognostic accuracy.

3. The method of claim 1, wherein prior to performing the dual-objective iterative partitioning procedure, the method further comprises allowing a user to pre-specify the balance point between compute cost and prognostic accuracy.

4. The method of claim 1, wherein performing the clustering operation involves using one or more of the following techniques:
    k-means clustering; and
    tri-point clustering.

5. The method of claim 1, wherein the inferential model is trained using a nonlinear, nonparametric (NLNP) regression technique.

6. The method of claim 5, wherein the NLNP regression technique comprises a Multivariate State Estimation Technique (MSET).

7. The method of claim 1, wherein using the prognostic pattern-recognition system to detect an incipient anomaly comprises detecting one or more of the following:
    an impending failure of the monitored system; and
    a malicious-intrusion event in the monitored system.

8. The method of claim 1, wherein obtaining the group of signals comprises:
    obtaining the group of signals from the sensors during operation of the monitored system;

storing the group of signals in a time-series database; and subsequently retrieving the group of signals from the time-series database for use in a dual-objective iterative partitioning procedure.

9. A non-transitory, computer-readable storage medium storing instructions that when executed by a computer cause the computer to perform a method for performing prognostic surveillance on a monitored system, the method comprising: obtaining a group of signals from sensors in the monitored system during operation of the monitored system; performing a cluster operation, which divides the group of signals into groups of correlated signals if possible; for one or more groups of signals that exceed a specified size, randomly partitioning the groups of signals into smaller groups of signals; for each group of signals, training an inferential model for a prognostic pattern-recognition system based on signals in the group of signals; and for each group of signals, using a prognostic pattern-recognition system in a surveillance mode and the inferential model to detect incipient anomalies that arise during execution of the monitored system; and obtaining from a user a pre-specified balance point between compute cost and prognostic accuracy; wherein randomly partitioning the groups of signals into smaller groups of signals comprises using a dual-objective iterative partitioning procedure, which optimizes a tradeoff according to the pre-specified balance point between prognostic accuracy and compute cost during subsequent prognostic surveillance operations.

10. The non-transitory, computer-readable storage medium of claim 9, wherein the dual-objective iterative partitioning procedure iteratively:
    partitions the groups of signals into smaller groups of signals in a random manner, without considering correlations between signals the groups of signals;
    trains and runs the inferential model on the smaller groups of signals;
    determines a compute cost and an associated prognostic accuracy involved in training and running the inferential model on the smaller groups of signals; and
    terminates the iterative procedure when a balance point is reached between compute cost and prognostic accuracy.

11. The non-transitory, computer-readable storage medium of claim 9, wherein prior to performing the dual-objective iterative partitioning procedure, the method further comprises allowing a user to pre-specify the balance point between compute cost and prognostic accuracy.

12. The non-transitory, computer-readable storage medium of claim 9, wherein performing the clustering operation involves using one or more of the following techniques:
    k-means clustering; and
    tri-point clustering.

13. The non-transitory, computer-readable storage medium of claim 9, wherein the inferential model is trained using a nonlinear, nonparametric (NLNP) regression technique.

14. The non-transitory, computer-readable storage medium of claim 13, wherein the NLNP regression technique comprises a Multivariate State Estimation Technique (MSET).

15. The non-transitory, computer-readable storage medium of claim 9, wherein using the prognostic pattern-recognition system to detect an incipient anomaly comprises detecting one or more of the following:
    an impending failure of the monitored system; and
    a malicious-intrusion event in the monitored system.

16. The non-transitory, computer-readable storage medium of claim 9, wherein obtaining the group of signals comprises:
    obtaining the group of signals from the sensors during operation of the monitored system;
    storing the group of signals in a time-series database; and
    subsequently retrieving the group of signals from the time-series database for use in a dual-objective iterative partitioning procedure.

17. A system that performs prognostic-surveillance operations on a monitored system, comprising: at least one processor and at least one associated memory; and a prognostic-surveillance mechanism that executes on the at least one processor, wherein during operation, the prognostic-surveillance mechanism: obtains a group of signals from sensors in the monitored system during operation of the monitored system; performs a cluster operation, which divides the group of signals into groups of correlated signals if possible; for one or more groups of signals that exceed a specified size, randomly partitions the groups of signals into smaller groups of signals; for each group of signals, trains an inferential model for a prognostic pattern-recognition system based on signals in the group of signals; for each group of signals, uses a prognostic pattern-recognition system in a surveillance mode and the inferential model to detect incipient anomalies that arise during execution of the monitored system; and obtains from a user a pre-specified balance point between compute cost and prognostic accuracy; wherein while randomly partitioning the groups of signals into smaller groups of signals, the prognostic-surveillance mechanism uses a dual-objective iterative partitioning procedure, which optimizes a tradeoff according to the pre-specified balance point between prognostic accuracy and compute cost during subsequent prognostic surveillance operations.

* * * * *

UNITED STATES PATENT AND TRADEMARK OFFICE
CERTIFICATE OF CORRECTION

PATENT NO. : 10,452,510 B2  
APPLICATION NO. : 15/793742  
DATED : October 22, 2019  
INVENTOR(S) : Gross et al.

Page 1 of 1

It is certified that error appears in the above-identified patent and that said Letters Patent is hereby corrected as shown below:

On the Title Page

Column 1, under Title, Line 2, delete "TECHNIQUES" and insert -- TECHNIQUE --, therefor.

In the Drawings

On sheet 6 of 10, in FIG. 6B, Line 1, delete "Computer" and insert -- Compute --, therefor.

In the Specification

In Column 1, Line 2, delete "TECHNIQUES" and insert -- TECHNIQUE --, therefor.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*